(12) United States Patent
Studer

(10) Patent No.: US 9,033,140 B2
(45) Date of Patent: May 19, 2015

(54) CONVEYING CHAIN FOR A CONVEYING DEVICE

(75) Inventor: Beat Studer, Hinwil (CH)

(73) Assignee: FERAG AG, Hinwil (CH)

( * ) Notice: Subject to any disclaimer, the term of this patent is extended or adjusted under 35 U.S.C. 154(b) by 4 days.

(21) Appl. No.: 13/997,340

(22) PCT Filed: Dec. 19, 2011

(86) PCT No.: PCT/CH2011/000302
§ 371 (c)(1),
(2), (4) Date: Jun. 24, 2013

(87) PCT Pub. No.: WO2012/088615
PCT Pub. Date: Jul. 5, 2012

(65) Prior Publication Data
US 2013/0277183 A1 Oct. 24, 2013

(30) Foreign Application Priority Data
Dec. 27, 2010 (CH) ........................ 2180/10

(51) Int. Cl.
*B65G 17/38* (2006.01)
*B65G 17/26* (2006.01)
*F16G 13/07* (2006.01)
*F16G 13/10* (2006.01)

(52) U.S. Cl.
CPC .............. *B65G 17/26* (2013.01); *B65G 17/385* (2013.01); *F16G 13/07* (2013.01); *F16G 13/10* (2013.01)

(58) Field of Classification Search
CPC .................................. B65G 17/38; B65G 17/40
USPC .................................................. 198/850–853
See application file for complete search history.

(56) References Cited

U.S. PATENT DOCUMENTS

| 3,231,069 | A | * | 1/1966 | Lanham ........................ 198/853 |
| 4,220,052 | A | | 9/1980 | Sheldon |
| 4,353,459 | A | * | 10/1982 | Petershack ..................... 198/852 |
| 2002/0148708 | A1 | * | 10/2002 | Bonnet ........................... 198/850 |
| 2007/0272523 | A1 | * | 11/2007 | Vietoris ......................... 198/851 |
| 2008/0132369 | A1 | | 6/2008 | Paul |
| 2010/0025200 | A1 | * | 2/2010 | Fandella ......................... 198/850 |
| 2010/0155200 | A1 | * | 6/2010 | Reist ............................. 198/850 |

FOREIGN PATENT DOCUMENTS

| DE | 102007057341 | 6/2008 |
| DE | 102008021233 | 10/2009 |
| EP | 0241631 | 10/1987 |
| EP | 0638501 | 2/1995 |
| EP | 1081078 | 3/2001 |

(Continued)

*Primary Examiner* — James R Bidwell
(74) *Attorney, Agent, or Firm* — Rankin, Hill & Clark LLP

(57) ABSTRACT

A chain link of a conveying chain, containing a base body with a first end region which comprises a first coupling section for the articulated connection to a coupling section of a first adjacent chain link, and with a second end region which comprises a second coupling section for the articulated connection to a coupling section of a second adjacent chain link. The base body comprises an intermediate region lying between the two end regions and includes a body section with bending-elastic characteristics, which is designed such that the first end region is elastically bendable relative to the second end region out of the longitudinal direction of the base body.

19 Claims, 11 Drawing Sheets

(56) References Cited

FOREIGN PATENT DOCUMENTS

| | | |
|---|---|---|
| EP | 1932781 | 6/2008 |
| EP | 2210831 | 7/2010 |
| FR | 2252268 | 6/1975 |
| FR | 2319818 | 2/1977 |
| FR | 2564810 | 11/1985 |
| FR | 2846642 | 5/2004 |
| WO | 98/13281 | 9/1997 |
| WO | 98/13281 | 4/1998 |
| WO | 2005087267 | 9/2005 |

* cited by examiner

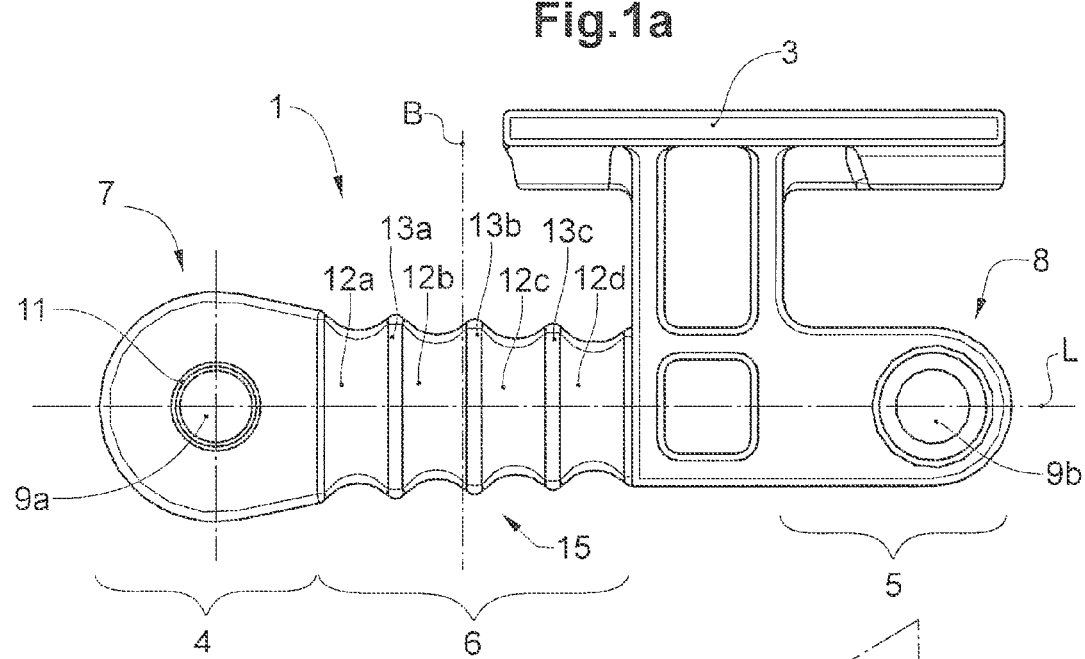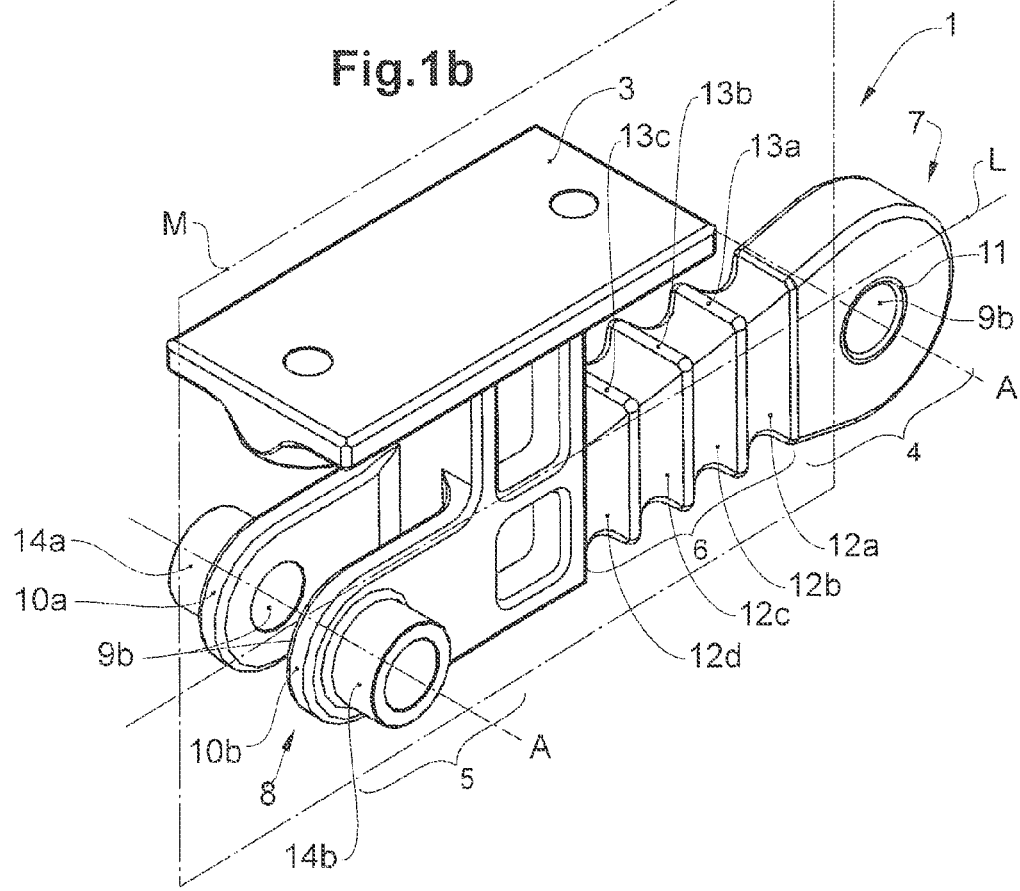

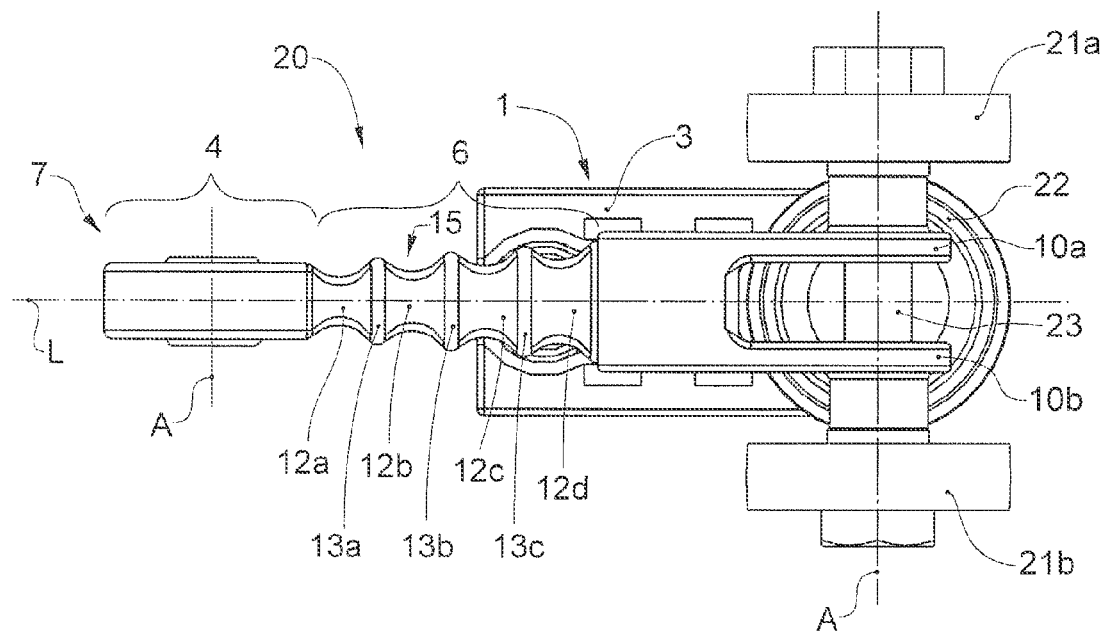
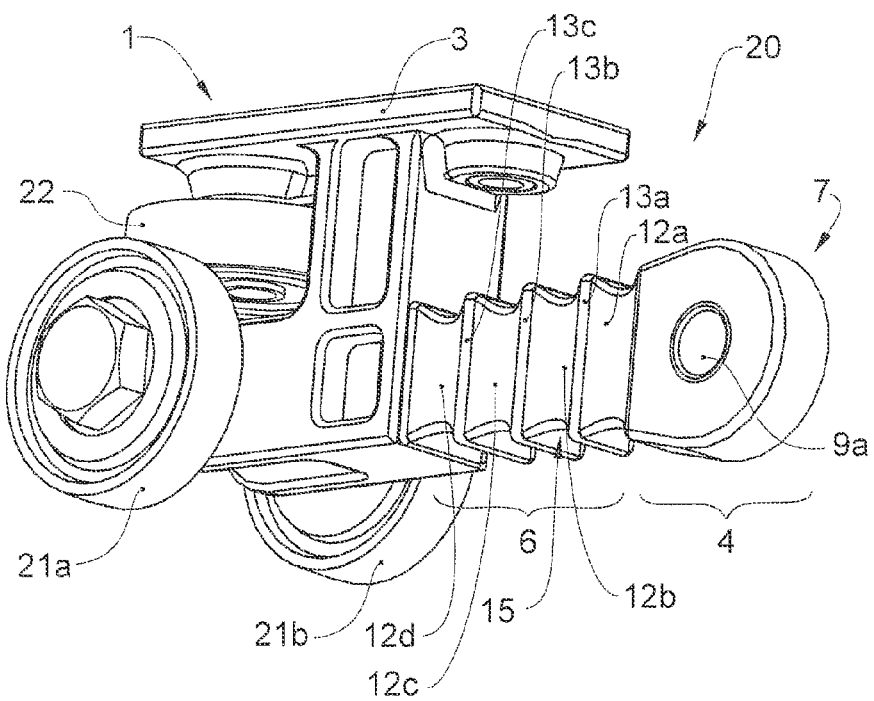

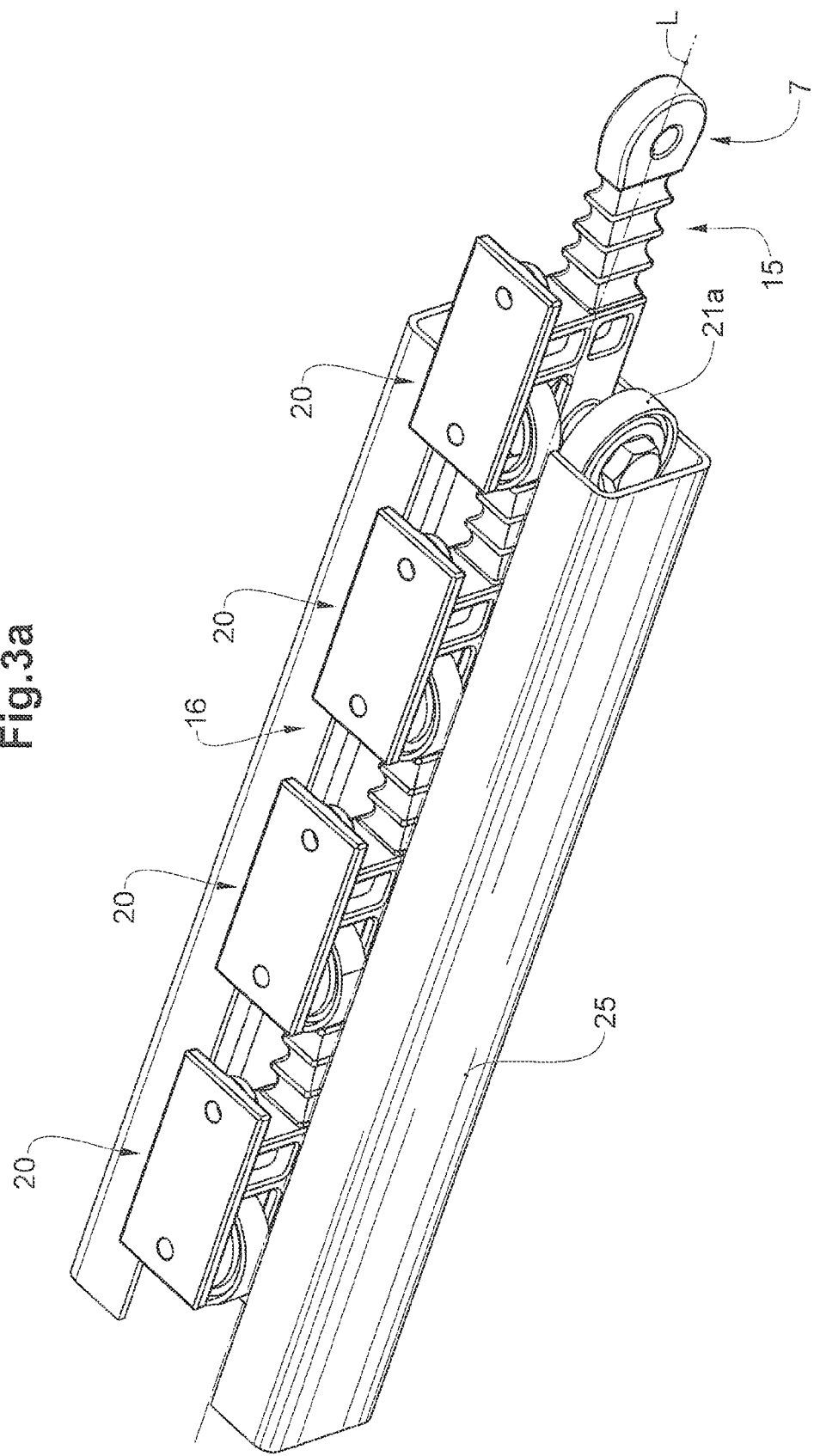

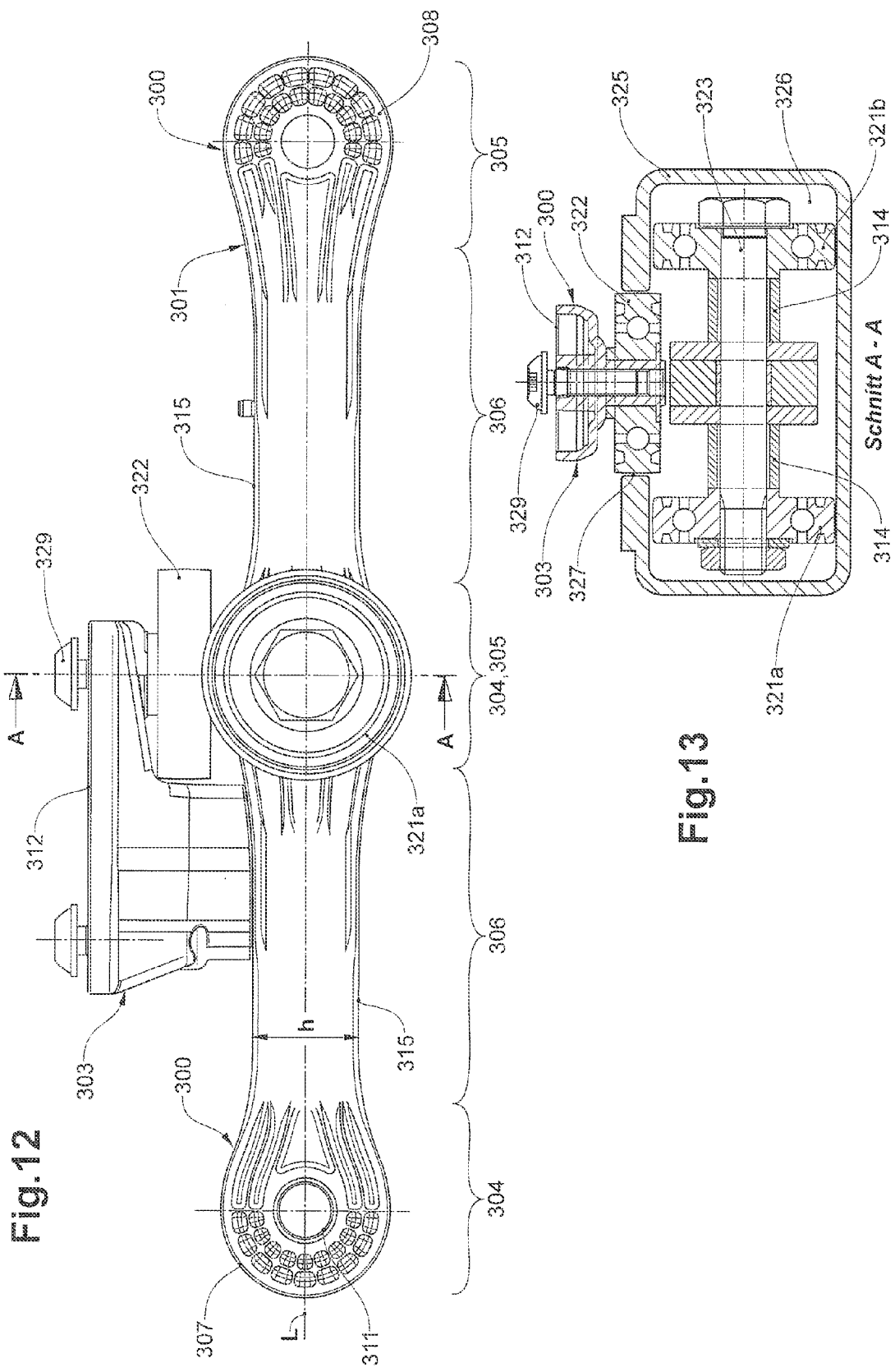

CONVEYING CHAIN FOR A CONVEYING DEVICE

BACKGROUND OF THE INVENTION

1. Field of the Invention

The invention relates to a chain link of a conveying chain, containing a base body with a first end region which comprises a first coupling section for the articulated connection to a coupling section of a first, adjacent chain link, and with a second end region which comprises a second coupling section for the articulated connection to a coupling section of a second, adjacent chain link. Moreover, the invention relates to a conveying chain which is formed of such chain links, as well as to a base body of such a chain link.

Conveying chains are applied in conveying technology, on which chains conveying members such as grippers or plate elements for conveying objects such as printed objects are for example attached. For this, the conveying chains are led along a revolving path by way of longitudinal guide devices of a conveying installation.

2. Description of Related Art

Such conveying chains as a rule are constructed of chain links connected to one another in an articulated manner. FR 2 232 497 for example describes a known embodiment of such a conveying chain. The conveying chain in this example consist of a plurality of chain links which in each case at a first end region comprise a first coupling section and at a second end region comprise a second coupling section. Both coupling sections contain openings arranged transversely to the longitudinal direction of the conveying chain. The second coupling section is designed in a fork-like manner. The chain links are connected to one another into a conveying chain, by way of the first coupling section being introduced between the fork lugs of the second coupling section of an adjacent chain link. A connection pivot is subsequently led through the opening on the first coupling section and on the fork tabs of the second coupling section and are connected to rotatably mounted runner rollers. The present design of the joint connection has the disadvantage that the chain links are pivotable only about one pivot axis formed by the connection pivot, i.e. in a plane perpendicularly to the connection pivot. A pivotability transversely to this, i.e. out of this plane, is not envisaged.

This limited pivotability of the chain links acts in a limiting manner on the design of the longitudinal guide device and the associated conveying path, along which the conveying chain is led. A limited deflection of the conveying chain out of the mentioned plane is only possible if the joint connection has play. Notwithstanding, such a design leads to an increased wear of the chain links, in particular in the region of the joint connections.

A ball joint link chain is suggested in the document DE 26 29 528, in order to avoid the outlined problem of the limited pivotability The pivotability out of the plane lying perpendicularly to the joint axis is achieved by a joint connection, with which the joint body of a first chain link which is designed in the form of a ball segment engages into a joint socket of an adjacent second chain link which is designed in an equal and opposite manner, and with this forms a type of ball-and-socket joint connection. The joint body is arranged in a fixed manner on a pivoting pivot which is arranged perpendicularly to the longitudinal direction of the chain link. In this manner, the chain links may likewise be pivoted in a plane which is aligned perpendicularly to the mentioned pivoting pin. Moreover, the joint connection also permits a pivot movement in a plane which is defined by the longitudinal direction of the connection elements and the pivoting pin axis. Moreover, the joint links can be rotated (twisted) with respect to one another about the longitudinal axis of the chain link.

The document EP 1 832 532 A2 also discloses a type of ball joint link chain, whose chain links form joint bearings. The joint bearings comprise two-part bearing housings which form a bearing socket for a bearing body. The bearing socket thereby encloses a joint body in a fixed manner. A partition plane which corresponds to a middle plane aligned perpendicularly to the housing axis is formed between the two bearing housing parts. Here too, the described joint connection additionally permits a movement perpendicular to the mentioned middle plane.

The embodiments of ball joint link chains described in the two documents DE 26 29 528 and EP 1 832 532 A2 however have the disadvantage that in each case components, in particular the joint socket and joint body, slide against one another with a pivoting movement. This over the longer term leads to an increased wear due to abrasion. An exchange of the ball joint link chains however requires much effort. Moreover, the joint socket and the joint body are greatly loaded due to the sometimes very high load peaks which occur for example as a result of an emergency stop.

BRIEF SUMMARY OF THE INVENTION

It is therefore the object of the present invention, to create a conveying chain of the known type, of chain links which at their coupling sections are pivotable about a pivot axis which is arranged perpendicularly to the longitudinal axis of the chain link or of the conveying chain. Moreover, the conveying chain should also be pivotable in a plane which is spanned by the longitudinal direction of the chain links and the pivot axis. The operation of the conveying chain should be low in wear despite the pivotability in different directions, and thus ensure a long service life with comparatively little effort with regard to maintenance.

The object is achieved by a chain link, a conveying chain, and a chain link base body, as described in the independent claims. The dependent claims represent preferred further developments of the invention or particular embodiments of the invention. Basically, the features which are described in the context of the chain link base body also apply to the chain links and conveying chains, which are based thereon, and vice versa.

The chain link base body thus comprises an intermediate region which lies between the two end regions and which has an elastically deformable body section, in particular a bending-elastic body section. The elastically deformable body section is preferably designed such that the position of the first end region relative to the second end region can be changed by way of elastic deformation of the body section.

This changeable position according to a particularly preferred embodiment is characterised by the fact that the mentioned body section is designed in an elastically bendable and/or elastically twistable manner. I.e., the first end region of the base body relative to the second end region, is elastically bendable advantageously out of the longitudinal direction L of the base body and/or elastically twistable about the longitudinal direction L of the base body.

The mentioned bendability is preferably envisaged at least in that plane which is spanned by the longitudinal direction L of the chain link or of the base body and the pivot axis A of the chain links relative to one another.

The changeable position alternatively or additionally to the position changes mentioned above can also be distinguished by a damping capability of the body section. This means that a damping within the chain link is achieved by an elastically deformable body section arranged in an intermediate region of the base body.

In this case, the position changes are comparatively small in comparison to a deflection. In this manner e.g. oscillations or impacts acting on an end region are not transmitted in an undamped manner onto the remaining base body, in particular onto the other end region. The elastically deformable body section can e.g. be designed for accommodating oscillations or impacts in the longitudinal direction L and/or transversely to the longitudinal direction L of the chain link.

Thus e.g. the elastically deformable body section can be designed such that the first and the second end region are displaceable relative to one another in the longitudinal direction L additionally or alternatively to the position changes mentioned above. In this manner, oscillations and impacts within the conveying chain due to operation are eliminated or at least partly damped and the structure-borne noise arising on account of this is reduced. A conveying chain designed in such a manner is characterised by a very smooth running and accordingly low noise emission. The aspect of an elastically deformable body section for the purpose of increasing the smoothness of running is to be considered as an independent invention.

The elastically deformable body section preferably contains at least one or more of the following materials or consists thereof:

a plastic material, in particular an elastomer;
a spring steel material;
a fibre-reinforced plastic.

The elastomer can e.g. be of natural rubber or of a synthetically manufactured elastomer. The fibres of a fibre-reinforced plastic material are preferably glass fibres. However, also other organic or inorganic fibres of mixtures of different fibre types, such as e.g. carbon fibres can be applied. The fibres can be long fibres or short fibres or be a mixture thereof. The fibres are preferably short fibres with a length of e.g. 3 to 20 mm. These can be scattered into the plastic matrix for example. The fibres can be orientated or non-orientated. The fibres can in particular be orientated in the direction of the longitudinal axis of the chain link. The fibres can be introduced into the plastic matrix individually or in the form of a textile sheet formation. The fibre share can e.g. be 20 to 60% by volume (volume percent). The plastic of the fibre-reinforced structure is preferably a thermoplastic or duroplastic. The fibres contribute to the tensile strength and the bending strength of the chain link in the body section, and therefore permit thin wall thicknesses with the design of the bending-elastic body section.

The elastically deformable body section preferably contains a tension element for accommodating tensile stresses. The tension element is preferably a longitudinal element which extends from the first end region through the intermediate region towards second end region and which in particular is integrated into the two end regions. The tension element can itself be designed in an elastically deformable, in particular bending-elastic manner.

If the tension element is designed in an elastically deformable manner, the elastically deformable body section can also consist of such a tension element. The tension element can be designed in a two-dimensional manner, e.g. as a sheet-metal part, plate or strip. The tension element may also be present in the form of a "ligament" or cable. The tension element is preferably of metal, in particular of steel. The tension element particularly preferably consists of a spring steel element. The tension element can however also consist of a plastic material.

In a preferred embodiment of such a chain link or base body, the elastically deformable body section has a rib-like structure with transverse ribs, wherein the transverse ribs run transversely to the longitudinal axis L. The body section structured in a rib-like manner can consist of a material, chiefly of a plastic material, or of several materials, wherein at least one material is preferably a plastic material.

The elastically deformable body section can also be designed as a two-dimensional and in particular thin-walled body section. The two-dimensional body section can e.g. be designed in a plate-like manner. The body section with its flat sides is preferably aligned parallel to a middle plane of the chain link. The wall thickness can e.g. be 1 to 5 mm, in particular 1 to 3 mm.

Thin-walled in particular means that the ratio of the wall thickness to the height of the body section is at least 1:3, preferably at least 1:5 and in particular at least 1:6. Moreover, the wall thickness of the body section is preferably significantly smaller than the width of the two coupling sections. The ratio of the wall thickness to the width of the two coupling sections can e.g. be at least 1:3, preferably at least 1:4.

The wall thickness continuously increases from the body section towards the two end regions. Sudden changes in the wall thicknesses which produce stress peaks are avoided in this manner. This embodiment is particularly well suitable for bending-elastic body sections of fibre-reinforced plastic.

The elastically deformable body section according to a further development of the invention is designed in a multi-layered manner in the longitudinal direction of the chain link. For this, elastically deformable, in particular bending-elastic segments and rigid intermediate elements or ones which are less elastic compared to the segments, are arranged one after the other in the longitudinal direction in an alternating manner.

The elastically deformable segments are preferably of an elastomer.

The intermediate elements are preferably plate-like elements.

The intermediate elements can for example be of metal or plastic.

The intermediate elements can e.g. be of a steel material or a light metal material, such as aluminium.

Thanks to this layered construction, the body section can accommodate greater compression forces acting in the longitudinal direction of the chain element, as well as shear stresses. The layered construction of elastomer segments and rigid intermediate elements, given compressive forces in the longitudinal direction of the base body, counteracts a displacement movement of the elastic elastomer material transversely to the pressure loading.

As described in a detailed manner within the scope of the embodiment examples, the body section constructed in a multi-layered manner can have a rib-like structure with transverse ribs, wherein the transverse ribs are formed by the rigid intermediate elements. If an additional tension element is provided, then this can be connected to the intermediate elements.

The body segments are connected to the intermediate elements preferably with a material fit.

However, alternatively to the above-mentioned material-fit connection or additionally to this, they can also be held together by a component which penetrates the elastically deformable body section in the longitudinal direction.

This component can e.g. be an integrated tension element, as is already described at another location.

According to a further preferred embodiment, the elastically deformable body section comprises at least one element of a spring-elastic material, which extends in the longitudinal direction L of the chain link. The element is preferably designed in a two-dimensional manner, in particular in a plate-like manner.

The element can be designed as a strip, e.g. as a sheet-metal strip. The element particularly preferably consists of spring steel.

The spring-elastic element with its end sections is admitted in each case preferably into the base body towards the first and second end region, or is integrated into this base body and connected to this e.g. with a positive fit and/or material fit. Thus in an injection moulding method, the element with its respective end sections can be cast into the base body towards the first and second end region. The spring-elastic element is preferably introduced up to the first and/or second coupling section.

It is also possible for the spring-elastic element described above to be combined with a body section of an elastomer or a multi-layered body section described above. In this case, the spring-elastic element is preferably integrated or cast into an elastomer body or into the multi-layered body section, i.e. is connected to this with a material fit.

This combination has the advantage that the spring-elastic element can accommodate tensile forces, whilst compression forces are introduced into the elastomer body or the multi-layered body section. An elastically deformable body section which is constructed in such a manner can be loaded in tension as well as compression in the longitudinal direction L of the chain link.

In a preferred design of the elastically deformable body section, this tapers in the longitudinal direction L of the chain link from the first end region in the direction of the second end region. It is also possible for the body section to taper in the opposite direction.

In a preferred design of the base body, the second end region comprises a fork-like, second coupling section with two fork lugs which are distanced to one another. The fork lugs form a receiver for the coupling section of an adjacent chain link. If the chain links of a conveying chain are constructionally equal with regard to shape, then the fork lugs form a receiver for the first coupling section of an adjacent chain link.

If the elastically deformable body section is formed from an elastically deformable, in particular bending-elastic element, e.g. of spring steel, then the body section can also comprise two spring-elastic elements extending in the longitudinal direction L of the chain link from the first end region in the direction of the second end region.

The two spring-elastic elements run next to one another in the intermediate region, preferably parallel next to one another.

The two elements however run apart, e.g. in a V-shaped manner, towards the second end region. Hereby, in each case a spring-elastic element leads into a fork lug. The spring-elastic element can be designed as described above.

The two coupling sections preferably comprise openings for receiving a joint pivot aligned perpendicularly to the longitudinal axis L. The first coupling section for example has a flattened coupling head with an opening.

A slide bush which serves as a guide for the joint pivot can be admitted into the opening of the first coupling section. This can e.g. be inserted, cast in, bonded in or pressed in and assume a friction-fit, positive-fit and/or material-fit connection with the first coupling section. The slide bush can consist of metal or plastic.

The second, fork-like coupling section e.g. in each fork lug, each comprises a common opening lying along a common pivot axis A. The pivot axis A which represents a geometric axis, lies parallel to the joint pivot which represents a physical axis and is led through the openings of the fork lugs and of the coupling head, for the purpose of creating a joint connection.

If the chain links of the conveying chain are designed equally with regard to the shaping, then the flat joint head of the first coupling section of a first chain link is pushed between the fork lugs of the second coupling section of an adjacent second chain link for creating a joint connection, and the openings of the fork lugs and of the joint head are aligned along a common pivot axis A. A joint pivot passing through the openings connects the two chain links.

Preferably, two runner rollers are fastened on the joint pivot in a rotatable manner on the outside and laterally of the fork lugs. The runner rollers are preferably distanced laterally from the fork lugs. In such a case, force transmission elements such as spacer sleeves, through which the joint pivot is led, are arranged between the runner rollers and the fork lugs, preferably on both sides. The force transmission elements which are arranged in each case between the runner rollers and the base body can also be applied with differently designed coupling sections.

The force transmission elements have the effect of transmitting the forces of a tilt moment acting on the pivot pin or rotation pin of the runner rollers, onto the base body of the chain link via force transmission elements. The pivot pins and rotation pins are relieved by way of this. Moreover, the force transmission elements result in the mentioned forces not acting linearly e.g. onto the end-side edge of the slide bushes in the joint head and damaging these or leading to a canting of the joint pivot. The force transmission elements thus prevent a high edge load and an edge pressing due to the tilting of the rotation pin e.g. in the slide bushes, which this edge load would entail.

The mentioned forces in contrast are transmitted in a surfaced manner into the base body of the chain link and in particular into the side wall of the fork lugs or fork arms, via end sides which are designed in a surfaced manner, of the force transmission elements designed e.g. as spacer sleeves, e.g. via an annulus-shaped surface.

As already mentioned, the individual chain link in each case comprises a chain link base body. The base body apart from the end region and the intermediate region can yet contain connection interfaces for the non-positive-fit and/or positive-fit attachment of a conveying member. The connection interface can comprise connection components such as connection plates or receivers, e.g. openings, via which a conveying member is fastened onto the base body of the chain link.

Such a conveying member can e.g. be a catch or carrier, such as a gripper, a clip, a plate element or a magnet body. This however should not be considered as a conclusive list.

The connection interface is preferably designed on the chain link in a manner such that this at least partly or completely lies outside a guide channel of a guide rail.

The base body with the end regions and the intermediate region can be designed in a single-part manner. Single-part in particular means that the individual elements of the base body cannot be released from this. In this case, the connection interface is preferably also an integral part of the base body. The base body preferably contains a plastic material or consists of this. The base body is preferably manufactured by way of an injection moulding method in one or more injection moulding steps.

Certain elements of the base body, in particular those which are not of plastic, can be applied into the injection moulding tool as inserts and at least partly can be peripherally injected with plastic during the manufacture of the base body, and in this manner be integrated into the base body with a positive fit and/or material fit.

The inserts can e.g. be the rigid intermediate elements, the spring-elastic elements, such as spring steel elements, tension elements but also slide bushes in the openings. The slide bushes can e.g. consist of metal, of a plastic material or a combination of metal and a plastic. The slide bushes can further be coated with PTFE (polytetrafluorethylene) or consist thereof.

Moreover, it is possible for different plastic materials to be injected in an injection moulding method and for a single-part base body from different plastic materials to be created. Thus e.g., by way of an injection moulding method, a plastic with elastic characteristics, in particular rubber-elastic characteristics, can be injected into the moulding tool in the intermediate region of the base body, whilst a second, non-elastic or non-rubber-elastic plastic is injected in one or more end regions or another region of the base body. Thermoplastic elastomers are particularly suitable for this. Multi-component injection tools, in particular two-component injection tools are used in such injection moulding methods.

A complete conveying chain link, apart from the base body, yet contains runner rollers and, as the case may be, guide rollers, via which suitable connection elements such as joint pivots, are attached onto the base body.

Thus the chain link can contain at least one guide roller, whose rotation axis is arranged e.g. perpendicularly to the rotation axis of the runner rollers and in particular also perpendicularly to the longitudinal direction of the chain link. The guide roller can e.g. be attached on the connection member of a connection interface, e.g. between both runner rollers.

The invention also relates to a conveying chain containing a plurality of chain links which are arranged one after the other and articulately connected to one another in the longitudinal direction L of the chain links via joint connections, wherein the chain links each have a first end region with a first coupling section and a second end region with a second coupling section, and the chain links are articulately connected to one another via the coupling sections. The conveying chain contains at least one chain link according to the invention which is described above. Preferably, the complete conveying chain consists of chain links according to the invention.

The chain links are pivotably connected to one another via coupling sections, usefully about a pivot axis A arranged perpendicularly to the longitudinal axis L. The first end region via the elastically deformable intermediate region is bendable relative to the second end region about a bending axis B which is arranged perpendicularly to the pivot axis A and perpendicularly to the longitudinal direction L. The bending axis corresponds e.g. to the curve axis of a curved section of the revolving path or conveying path, along which the conveying chain is led.

In a preferred further development, with regard to shaping or configuration and preferably with regard to shaping and materials, the conveying chain is constructed of constructionally equal chain links.

In this case, in each case the first coupling body of a first chain link assumes an articulated connection with the second coupling body of an adjacent, second chain link. The term "constructionally equal with regard to shaping" in particular is related to end regions, intermediate regions and, as the case may be, connection interfaces, which are formed identically with regard to design.

The individual chain link or the joint connection between the individual chain links is preferably designed such that the conveying chain can be driven via compression forces or tension forces. The joint connections are accordingly designed such that these can transmit tensile forces and/or compressive forces between the chain links. The conveying chain should thus be able to be pulled as well as pushed.

The conveying chain according to the invention, as also the conveying chains according to the state of the art, permits a pivot movement of the chain links about the pivot axis A, wherein the pivot movement is limited along the middle plane M of the chain link. The pivotability of the conveying chain about the curve axis of the conveying chain which lies perpendicularly to the pivot axes A and the longitudinal axes L of the chain links, is achieved by the elastically deformable intermediate regions of the chain links. The deflection of the first end region relative to the second end region of an individual chain link, although being limited, the conveying chain however achieves a significant total deflection amount the mentioned curve axis of the conveying chain due to the sum of the deflections within the individual chain links. The deflection within the chain links can be 5 to 10° (angle degrees), in particular 6 to 8°.

Moreover, the intermediate region or the associated elastically deformable body section can additionally be yet designed such that this can also be twisted by a certain amount about the longitudinal axis L of the chain link L. Thus e.g. a torsion of up to 10° (angle degrees) can be envisioned. The two end regions of the chain link can be twisted relate to one another by way of this. This thus permits a twisting of the conveying chain.

The pivotability of the chain links which is mentioned above permits the conveying chain to be led in all three spatial dimensions. The guide path can in particular be designed in a spiral manner, with simultaneous left curves and right curves and positive or negative gradients.

The wear on the chain links can be kept low due to the fact that no components slide or rub against one another with the deflection of the intermediate region for the purpose of pivoting the first coupling section with respect to the second coupling section.

The chain links according to the invention moreover permit a lightweight construction of the conveying chain, by way of this being able to be manufactured at least partly of a plastic material. For this, the chain links can be designed with a type of hollow construction manner with open and/or closed chambers. One also requires less drive power due to the act that the conveying chain has a comparatively low weight and moreover ensures a low-friction operation. The drives can therefore be dimensioned accordingly.

BRIEF DESCRIPTION OF THE DRAWINGS

The subject-matter of the invention is hereinafter explained in more detail by way of preferred embodiments which are represented in the accompanying drawings. Schematically, in each case are shown in:

FIG. 1a is an elevation view of a first embodiment of a chain link base body according to the invention;

FIG. 1b is a perspective view of a chain link base body according to FIG. 1a;

FIG. 2a is a plan view from below of a first embodiment of a chain link according to the invention;

FIG. 2b is a perspective view of a chain link according to FIG. 2a;

FIG. 3a is a perspective view of a conveying chain of chain links according to FIGS. 2a and 2b, and of a longitudinal guide device;

FIG. 3b is a cross-sectional elevation view through an arrangement according to FIG. 3a;

FIG. 5b is a plan view from below of the third embodiment of a chain link according to the invention and according to FIG. 5a;

FIG. 12 is an elevation view of the chain link according to FIG. 10; and

FIG. 13 is a cross-sectional elevation view along the line A-A of the chain link according to FIG. 10, which is guided in a guide rail.

The reference numerals used in the drawings and their significance are listed in a conclusive manner in the list of reference numerals. Basically, the same parts are provided with the same reference numerals in the figures.

DETAILED DESCRIPTION OF THE INVENTION

Figure 2C:
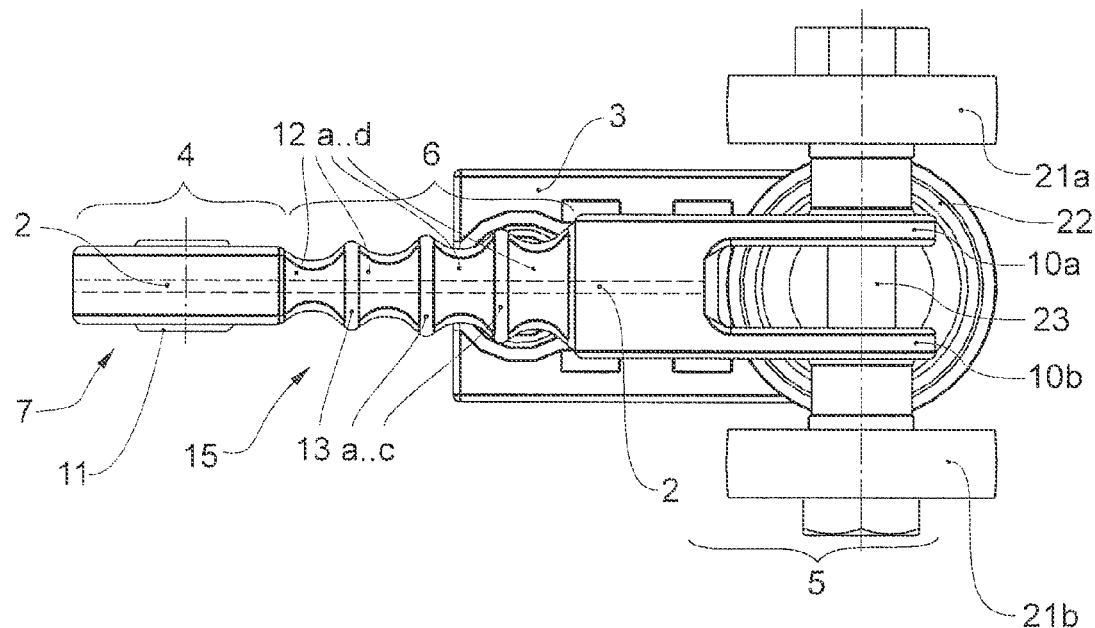
FIG. 2c is a plan view from below of a modified first embodiment of a chain link according to the invention.
Figure 3B:
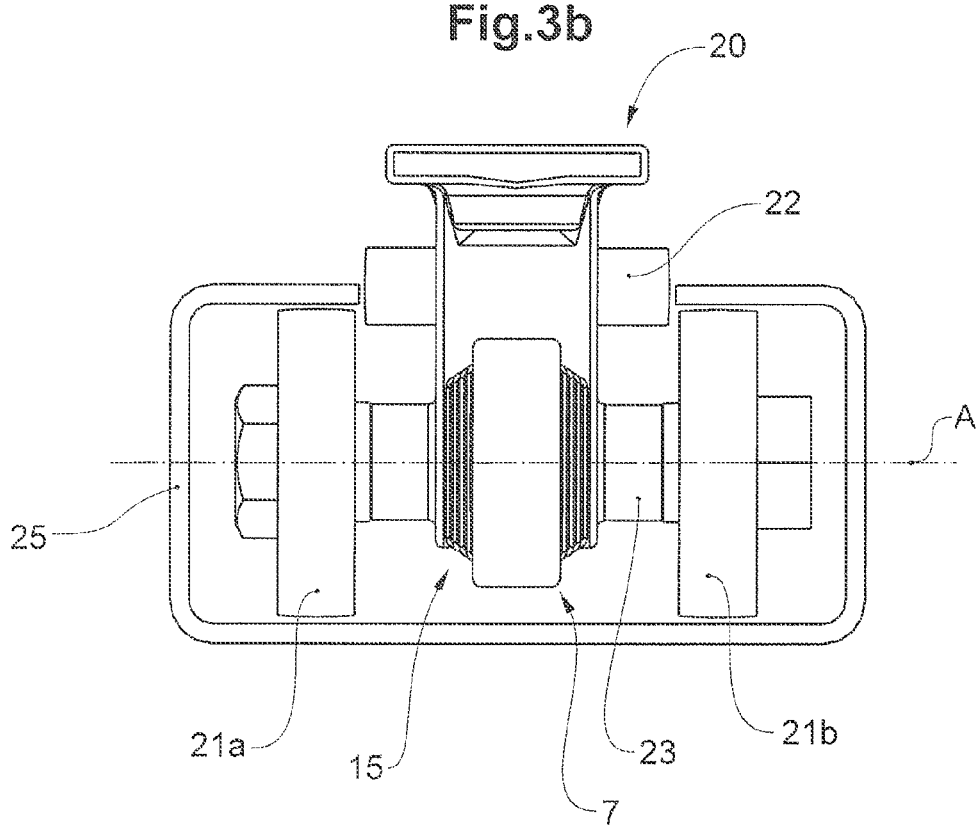

The chain link base body 1 which is shown in the FIGS. 1a-1b, 2a-2c and 3a-3b comprises a first end region 4 which forms a first coupling section 7, a second end region 5 which forms a second coupling section 8, as well as an intermediate region 6 which forms a bending-elastic body section 15. Moreover, the base body 1 comprises a connection interface 3 in the form of a connection plate for fastening a conveying member (not shown). The bending-elastic body section 15 connects the first coupling section 7 to the remaining base body which contains the second coupling section 8 as well as the connection interface 3 for the conveying member.

The bending-elastic body section 15 is designed such that the first coupling section 7 can be bent about a bending axis B relative to the second coupling section 8 (FIG. 3a). The bending axis B lies parallel to a middle plane M which is spanned by the longitudinal axis L and a straight line arranged perpendicularly to the pivot axis A and perpendicularly to the longitudinal axis L. The base body 1 with the two end regions 4, 5, the intermediate region 6 as well as the connection interface 3 is preferably designed in a single-part manner. The two end regions 4, 5 are further twistable relative to one another about the longitudinal axis L via the elastically deformable body section 15.

The first coupling section 7 comprises a coupling head flattened on both sides, with an opening 9a, through which a joint pivot 23 is inserted for the purpose of creating a joint connection between the chain links, as is described hereinafter. A slide bush 11 which receives the mentioned joint pivot 23 is integrated into the opening 9a.

The second coupling section 8 is designed in a fork-like manner and comprises two fork lugs or fork arms 10a, 10b which are distanced to one another. The fork lugs 10a, 10b form a receiver for the first coupling section 7 of an equally designed base body 1 of an adjacent chain link 20. The fork lugs 10a, 10b run parallel to the middle plane M.

Openings 9b, through which a joint pivot 23 (see FIG. 2a) is guidable, run aligned to one another through the fork lugs 10a, 10b. The joint pivot 23 forms a pivot axis A for the chain links 20 which are connected to one another, as well as, as the case may be, a rotation axis for runner rollers which are attached on the outside (not shown). Pin sleeves 14a, 14b, also called spacer sleeves are attached on the fork lugs 10a, 10b on the outside and are arranged flush with the openings 9b of the fork lugs 10a, 10b and through which the joint pivot 23 can also be led (not shown).

The bending-elastic body section 15 is designed in a multi-layered and ribbed manner in the longitudinal axis L of the base body 1, i.e. in its longitudinal direction. For this, bending-elastic body segments 12a-12d and rigid intermediate elements 13a-13c are arranged one after the other in the longitudinal direction L in an alternating manner. The bending-elastic body segments 12a-12d are of an elastomer, such as e.g. rubber. The rigid intermediate elements 13a-13c are plate-like elements of metal or plastic. The plate-like intermediate elements 13a-13c on the bending-elastic body section 15 form a rib-like structure, by way of the bending-elastic body segments 12a-12d, considered transversely to the longitudinal axis L, having a reduced diameter at least in sections, compared to the intermediate elements 13a-13c.

The bending-elastic body segment 12a-12d, considered transversely to the longitudinal axis L, in each case has a part-peripheral or fully peripheral concave recess, for the purpose of avoiding stress peaks towards the respective intermediate elements 13a-13c, wherein the diameter of the body segment 12a-12d in each case increases towards the intermediate element 13a-13c. The diameter of the bending-elastic body segment 12a-12d which is reduced in each case compared to the intermediate elements 13a-13c, acts in a positive manner on the bending characteristics of the body section. Thus on the one hand the bending radius is increased, and on the other hand the bending forces are reduced with this measure. The bending-elastic body section 15 tapers towards the first coupling section 7 (FIGS. 1a, 2a, 3a).

Moreover, a modification of the described embodiment according to FIGS. 1 and 2a to 2b is illustrated in FIG. 2c. A tension element 2 extending from the first end region 4 through the intermediate region 6 towards the second end region 5 can be integrated into the base body 1. The tension element 2 can be a spring-elastic longitudinal element of a spring-steel material or plastic material. The tension element 2 can be designed in a surfaced manner analogously to the spring steel element according to FIGS. 5a to 5c and can be arranged accordingly upright, so that a common bending axis B parallel to the middle plane M is formed with the body section of body segments 12a . . . d and intermediate elements 13a . . . c.

The combination of the described body section 15 with a tension element 2 has the advantage that such a conveying chain can be loaded with tension as well as compression. Whereas tensile forces are introduced into the tension element 2, compression forces are accommodated by the segmented body section 15.

The tension element can e.g. be integrated as an insert into the base body 1 with an injection moulding method.

The chain link 20 according to the invention (FIGS. 2a-2b and 3a-3b), apart from the base body 1 described above, comprises two runner rollers 21a, 21b in the region of the joint connection. A joint pivot 23 for this penetrates the two openings 9b in the fork lugs 10a, 10b and is connected to runner rollers 21a, 21b arranged laterally and to the outside on the fork lugs 10a, 10b (FIG. 2a). For creating a joint connection between two chain links 20, the flattened coupling head of the first coupling section 7 is furthermore inserted between the fork lugs 10a, 10b, wherein the joint pivot 23 is led through the two openings 9b of the fork lugs 10a, 10b and through the opening 9a of the coupling head. The openings 9a, 9b, the joint pivot 23 as well as the rotation axes of the runner rollers 21a, 21b all lie in a common pivot axis A.

The chain link 20 moreover contains a guide roller 22 which is rotatably attached on the chain link base body 1 and whose rotation axis is perpendicular to the pivot axis A and perpendicular to the longitudinal axis L of the chain link 20. The guide roller 22 serves for the lateral guiding of the conveying chain 16 in a guide rail 25. The conveying chain 16 according to FIGS. 3a and 3b consists of a plurality of chain links 20 which are articulately connected to one another as described above and are guided in a C-shaped guide rail 25. The chain links 20 for this roll with their runner rollers 21a, 21b on the guide rail, whilst the conveying chain 16 is laterally guided in the region of the rail opening, by the guide rollers 22.

Figure 4:
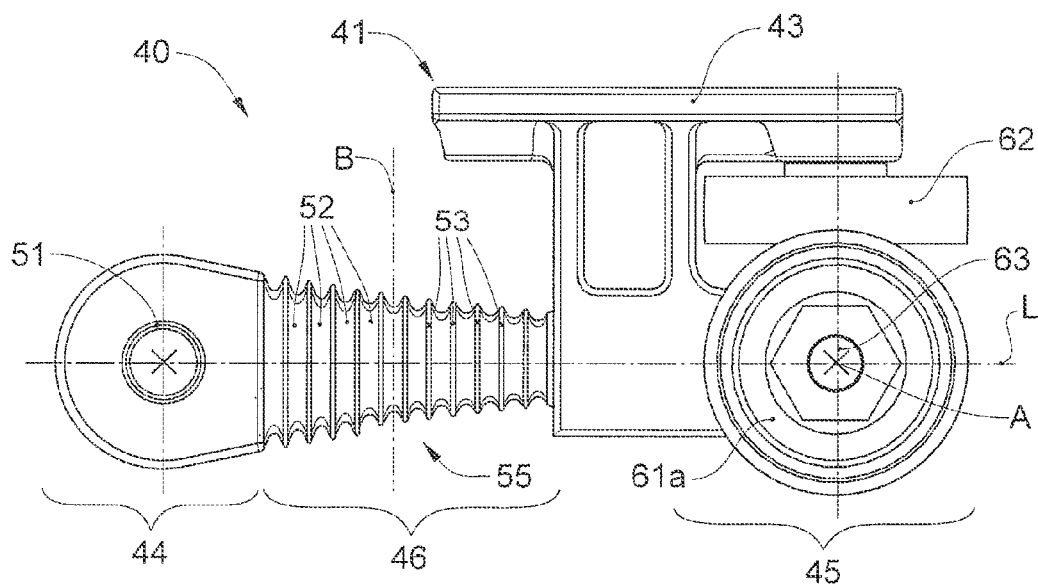
FIG. 4 is an elevation view of a second embodiment of a chain link according to the invention.

FIG. 4 shows a further embodiment variant of a chain link 40 according to the invention, with a chain link base body 41 as well as runner rollers 61a attached thereon and a guide roller 62. The chain link 40 and its base body 41 are basically constructed in the same manner as the chain link 20 and base body 1 respectively, according to FIGS. 1 and 2. Here too, the base body 41 contains a first end region 44 which forms a first coupling section 47, a second end region 45 which forms a second coupling section (not visible in FIG. 4) as well as an intermediate region 46 which forms a bending-elastic body section 55. Moreover, the base body 41 comprises a connection interface 43 in the form of a connection plate for fastening a conveying member (not shown). The bending-elastic body section 55 connects the first coupling section 47 to the remaining base body which contains the second coupling section as well as the connection interface 43 for the conveying member.

The first coupling section 47 likewise comprises a coupling head having an opening 49a and flattened on both sides, for creating a joint connection between the chain links. A slide bush 51 is integrated into the opening 49a and receives the joint pivot 63 of an adjacent chain link 40.

The second coupling section is likewise designed in a fork-like manner and comprises two fork lugs which are distanced to one another (not visible in FIG. 4). The fork lugs 41 form a receiver for the first coupling section 47 of a base body 41 of an adjacent chain link 40 which is designed in the same manner. The base body 41 with the mentioned elements is likewise manufactured as one part. The base body 41 in particular is manufactured by way of an injection moulding method.

The present embodiment variant differs from the embodiment variant shown in FIGS. 1 and 2 by a differently designed, bending-elastic body section 55. This however is likewise designed such that the first coupling section 47 can be bent about a bending axis B relative to the second coupling section 48. The bending-elastic body section 55 is likewise designed in a multi-layered and ribbed manner in the longitudinal axis L of the base body 41. For this, a multitude of bending-elastic body segments 52 and rigid intermediate elements 53 are arranged one after the other in the longitudinal direction L in an alternating manner.

For the sake of an improved overview, the body segments 52 and the intermediate elements 53 are each indicated with the same reference numerals. In contrast to FIGS. 1 and 2, in this embodiment example, essentially more body segments 52 and intermediate elements 52 are provided, which accordingly have a lower extension in the longitudinal direction L.

The bending-elastic body segments 52 are likewise of an elastomer, e.g. rubber. The rigid intermediate elements 53 are plate-like elements of metal or plastic. The plate-like intermediate elements 53 likewise form a rib-like structure on the bending-elastic body section 55, by way of the bending-elastic body segments 52 in each case at least in sections having a diameter which is reduced compared to the intermediate elements 53, considered transversely to the longitudinal axis L. The bending-elastic body segment 52 in each case considered transversely to the longitudinal axis L has a part-peripheral or fully peripheral concave recess, wherein the diameter of the body segment 52 in each case increases towards the intermediate element 53. The bending-elastic body section 55 further tapers towards the first coupling section 47.

The bending-elastic body section 15, 55 according to the two embodiments according to FIGS. 1 to 4 is each designed in a rectangular manner in a cross section transverse to the longitudinal axis L. Basically, the body section 15, 55 however may assume any cross-sectional shape. The cross-sectional shape can e.g. also be generally polygonal, circular or oval.

Figure 5A:
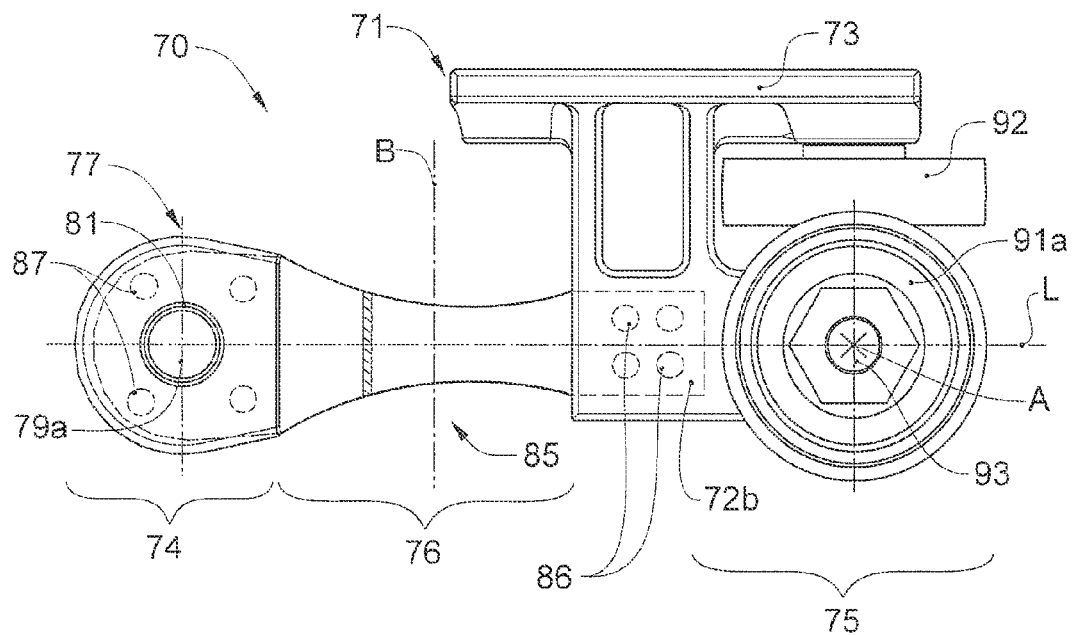
FIG. 5a is an elevation view of a third embodiment of a chain link according to the invention.
Figure 5B:
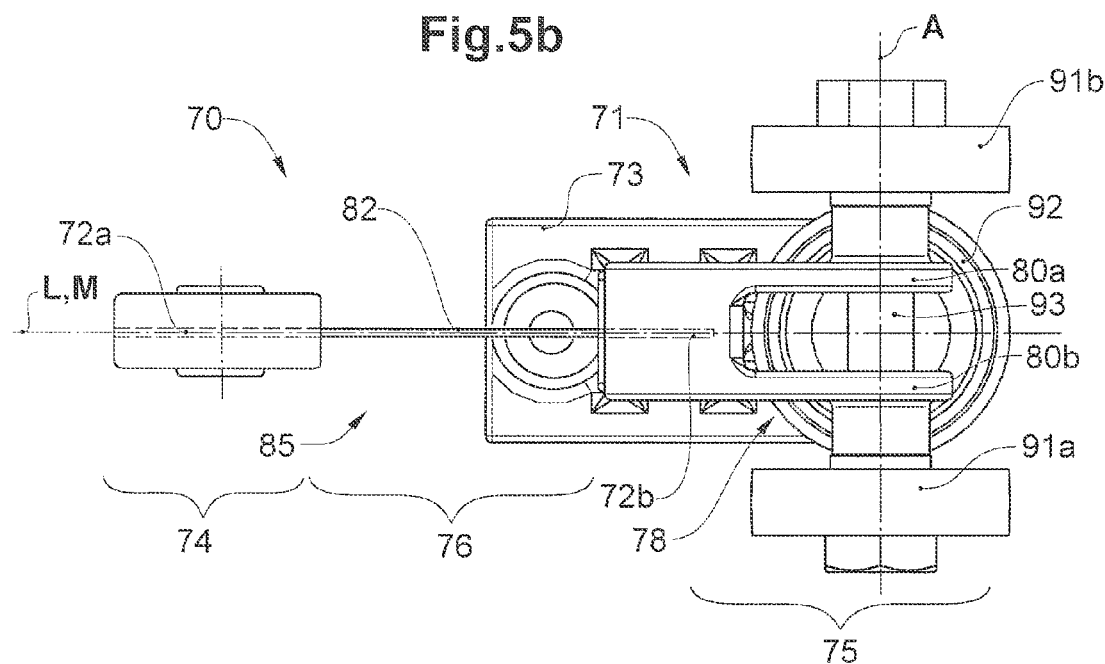

FIGS. 5a and 5b shows a further embodiment of a chain link 70 according to the invention, with a chain link base body 71 as well as runner rollers 91a, 91b attached thereon and with a guide roller 92. The chain link 70 and its base body 71 are basically constructed analogously to the two embodiments of chain inks 20, 40 according to FIGS. 1 to 4 which are described above. The base body 71 here too contains a first end region 74 which forms first coupling section 77, a second end region 75 which forms a second coupling section 78, as well as an intermediate region 76 which forms a bending-elastic body section 85.

Moreover, the base body 71 comprises a connection interface 73 in the form of a connection plate for fastening a conveying member (not shown). The bending-elastic body section 85 connects the first coupling section 77 to the remaining base body which contains the second coupling section 78 as well as the connection interface 73 for the conveying member.

The first coupling section 77 likewise comprises a coupling head which is flattened on both sides, with an opening 79a, for creating a joint connection between the chain links. A slide bush 81 is integrated into the opening 79a and receives the joint pivot 93 of an adjacent chain link 70.

The second coupling section 78 is likewise designed in a fork-like manner and comprises two fork lugs 80a, 80b which are distanced to one another. The fork lugs 80a, 80b form a receiver for the first coupling section 77 of an equally formed base body 71 of an adjacent chain link 70.

The present embodiment variant differs from the two other embodiments according to FIGS. 1 to 4 by way of a differently designed, bending-elastic body section 85. This however is likewise designed such that the first coupling section 77 can be bent about a bending axis B relative to the second coupling section 78.

The bending-elastic body section 85 consists of a surfaced element 82 of spring steel which runs in the longitudinal axis L of the base body 71. The surfaced spring steel element 82 is aligned upright in a lateral view according to FIG. 5 and lies parallel to the middle plane M, so that the first end region 74 is pivotable relative to the second end region 75 about a bending axis B lying perpendicularly to the longitudinal axis L and to the pivot axis A. The spring steel element with a first end section 72a is integrated into the first coupling section 77 and with a second end section 72b is integrated into the second coupling section 78 or into the base body which contains this. The first and the second end section 72a, 72b in each case comprise recesses or openings 86, 87. These openings 86, 87 are filled with plastic in the injection moulding method, so that a positive-fit connection arises between the end regions and the element 82.

The spring steel element 82 can be designed in a manner such that this with its first end section is integrated completely into the first coupling section 77 and partly or completely surrounds the opening 79a (see FIG. 5b). For this, the spring steel element comprises a suitable recess or opening. In this manner, the first coupling section 77 can be additionally reinforced, in particular in the region of the opening 79a.

The spring steel element moreover in the intermediate region 76 along its two narrow edges comprises a concave recess, by which means a neck-like narrowing is formed. This narrowing in turn reduces the bending force to be mustered and improves the bending ability of the bending-elastic body section 85 with a small force effort.

Figure 5C:
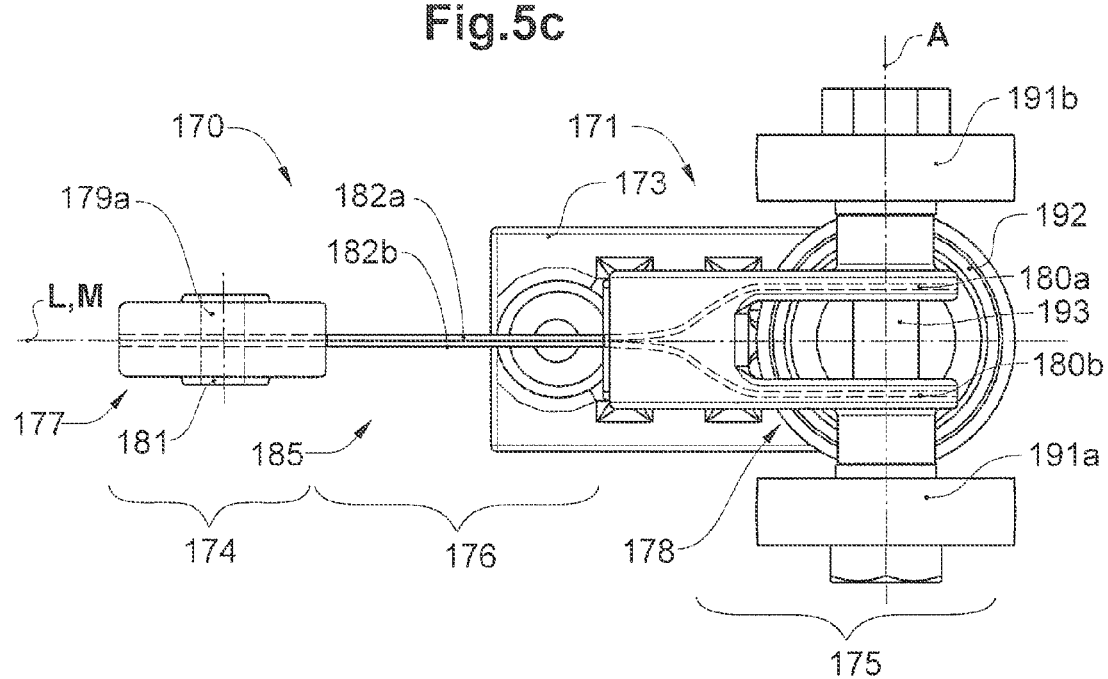
FIG. 5c is a plan view from below of a modified, third embodiment of a chain link according to the invention.

An embodiment of a chain link 170 which is modified with respect to FIGS. 5a and 5b is shown in FIG. 5c. This likewise contains a chain link base body 171 as well as runner rollers 191a, 191b attached thereto and a guide roller 192. The chain link 170 and its base body 171 are basically constructed analogously to the embodiment according to FIGS. 5a-5b. Here too, the base body 171 contains a first end region 174 which forms a first coupling section 177, a second end region 175 which forms a second coupling section 178, as well as an intermediate region 176 which forms a bending-elastic body section 185. Moreover, the base body 171 has a connection interface 173 in the form of a connection plate for fastening a conveying member (not shown). The bending-elastic body section 185 connects the first coupling section 177 to the remaining base body which contains the second coupling section 178 as well as the connection interface 173 for the conveying member.

The first coupling section 177 likewise comprises a coupling head which is flattened on both sides and has an opening 179a, for creating a joint connection between the chain links 170. A slide bush 181 which receives the joint pivot 193 of an adjacent chain link 170 is integrated into the opening 179a.

The second coupling section 178 is likewise designed in a fork-like manner and comprises two fork lugs 180a, 180b which are distanced to one another. The fork lugs 180a, 180b form a receiver for the first coupling section 177 of an equally designed base body 171 of an adjacent chain link 170.

The present embodiment variant differs from the embodiment according to FIGS. 5a-5b by way of the fact that here the bending-elastic body section 185 contains two surfaced elements 182a, 182b of spring steel. The body section 185 is however likewise designed such that the first coupling section 177 can be bent about a bending axis B relative to the second coupling section 178, analogously to the embodiment according to FIGS. 5a-5b.

The two spring steel elements 182a, 182b are aligned in an upright manner analogously to the embodiment according to FIGS. 5a-5b, and lie parallel to the middle plane M, so that the first end region 174 is pivotable relative to the second end region 175 about a bending axis B lying perpendicularly to the longitudinal axis L and perpendicularly to the pivot axis A. The two end regions 174, 175 are moreover twistable relative to one another about the longitudinal axis L via the elastically deformable body section 185. The spring steel elements 182a, 182b are each integrated with a first end section into the first coupling section 177 and with a second end section into the second coupling section 178. The two spring steel elements 182a, 182b run parallel to one another in the intermediate region 176. The two elements 182a, 182b however in the base body 171 run apart in a V-shaped manner towards the second end region 178, wherein a spring steel element leads in each case into one of the fork lugs 180a, 180b.

The spring steel elements 182a, 182b are designed in a manner such that these with their first end sections are completely integrated into the first coupling section 177 and partly or completely surround the opening 179a. The spring steel elements 182a, 182b comprise a suitable recess or opening for this (not shown). Moreover, the spring steel elements 182a, 182b are designed in a manner such that these with their two end sections are integrated completely into the second coupling section 178 and partly or completely surround the openings in the fork lugs 180a, 180b. For this, the spring steel elements 182a, 182b likewise comprise a suitable recess or opening in each case (not shown).

The base body 71 according to FIGS. 5a-5b or the base body 171 according to FIG. 5c is likewise manufactured with the mentioned elements in a single-part manner. For manufacturing the base body 71, 171, the spring steel element 82 can be inserted as an insert, or the spring steel elements 182a, 182b can be inserted as inserts, into an injection moulding tool, wherein in a subsequent injection moulding step, the coupling section 77, 177 and the remaining base body with the second coupling section 78, 178 and the connection interface 73, 173 are cast of plastic and together with the spring steel element or the spring steel elements are moulded into a single-part work-piece.

Figure 6:
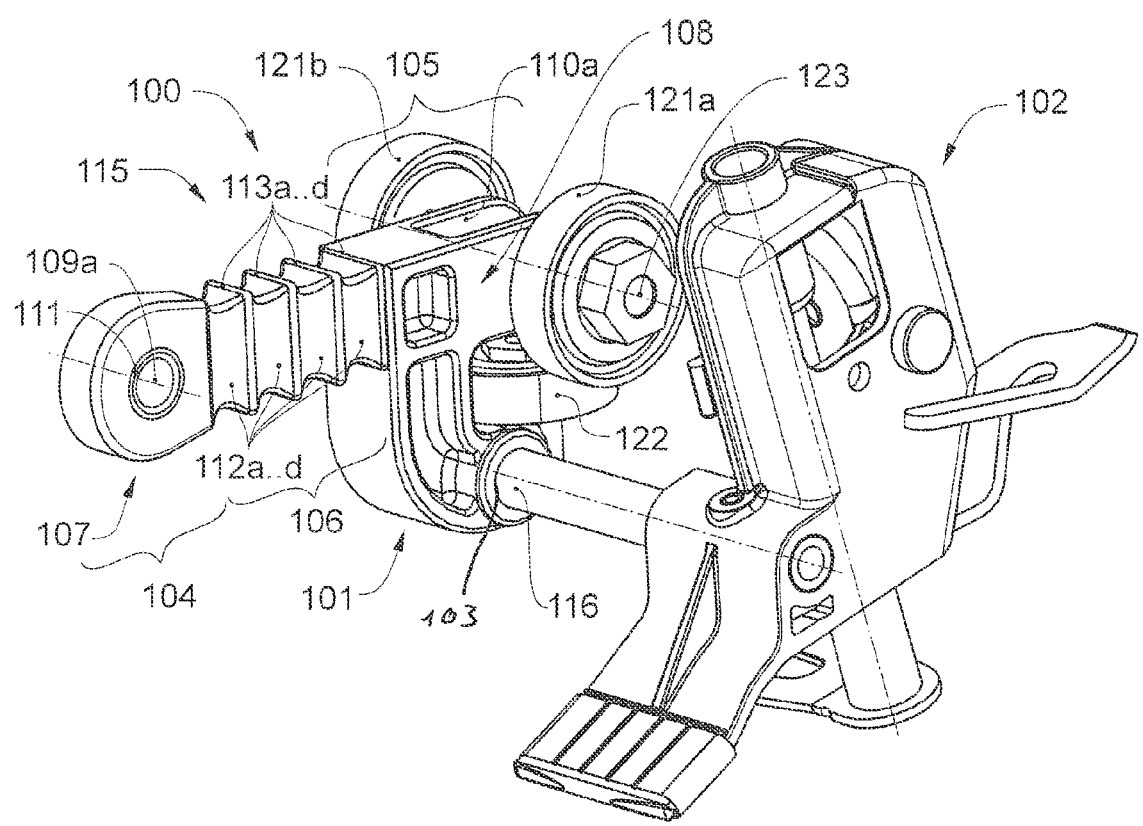
FIG. 6 is a perspective view of a chain link according to the invention, with a convening member.

FIG. 6 shows a chain link 100 which with regard to its first end region 104, its second end region 105 and its intermediate region 106, is designed in the same manner as the chain link 20 with respect to FIGS. 2a to 2c. The first end region 104 likewise forms a first coupling section 107 in the form of a flattened coupling head with an opening 109a and a slide bush 111 integrated therein. The second end region 105 comprises a second coupling section 108 which is likewise designed in a fork-like manner. This comprises two fork lugs 110a, 110b which are distanced to one another.

The intermediate region 106 comprises a bending-elastic body section 115, consisting of elastic body segments 112a . . . d and rigid intermediate elements 113a . . . c, which are arranged in an alternating manner, as already explained above. The two end regions 104, 105, relative to one another, are bendable about a bending axis B and twistable about the longitudinal axis L, analogously to the embodiment example according to FIGS. 2a to 2c.

Moreover, a joint pivot 123 is provided, which is led through the openings in the fork tabs 110a, 110b and via which two runner rollers are rotatably fastened laterally on the fork lugs 110a, 110b at the outside. The chain link 100 moreover comprises a guide roller 122 as is likewise described above.

The present embodiment differs from the embodiment according to FIGS. 2a-2c due to the fact that the base body 101 comprises a connection interface 103 for fastening a conveying clip 102. For this, the connection interface 103 comprises an opening or a passage, into which a connection pivot 116 is introduced or through which a connection pivot 116 is led. The conveying clip 102 is fastened onto the connection pivot 116 which here is designed in a bolt-like manner.

The shown clip 102 with regard to its functional construction is known from the state of the art. Such a clip with the same manner of functioning for example is described in detail in CH 592 562 A, which is why a detailed description of this is omitted here.

Figure 7:
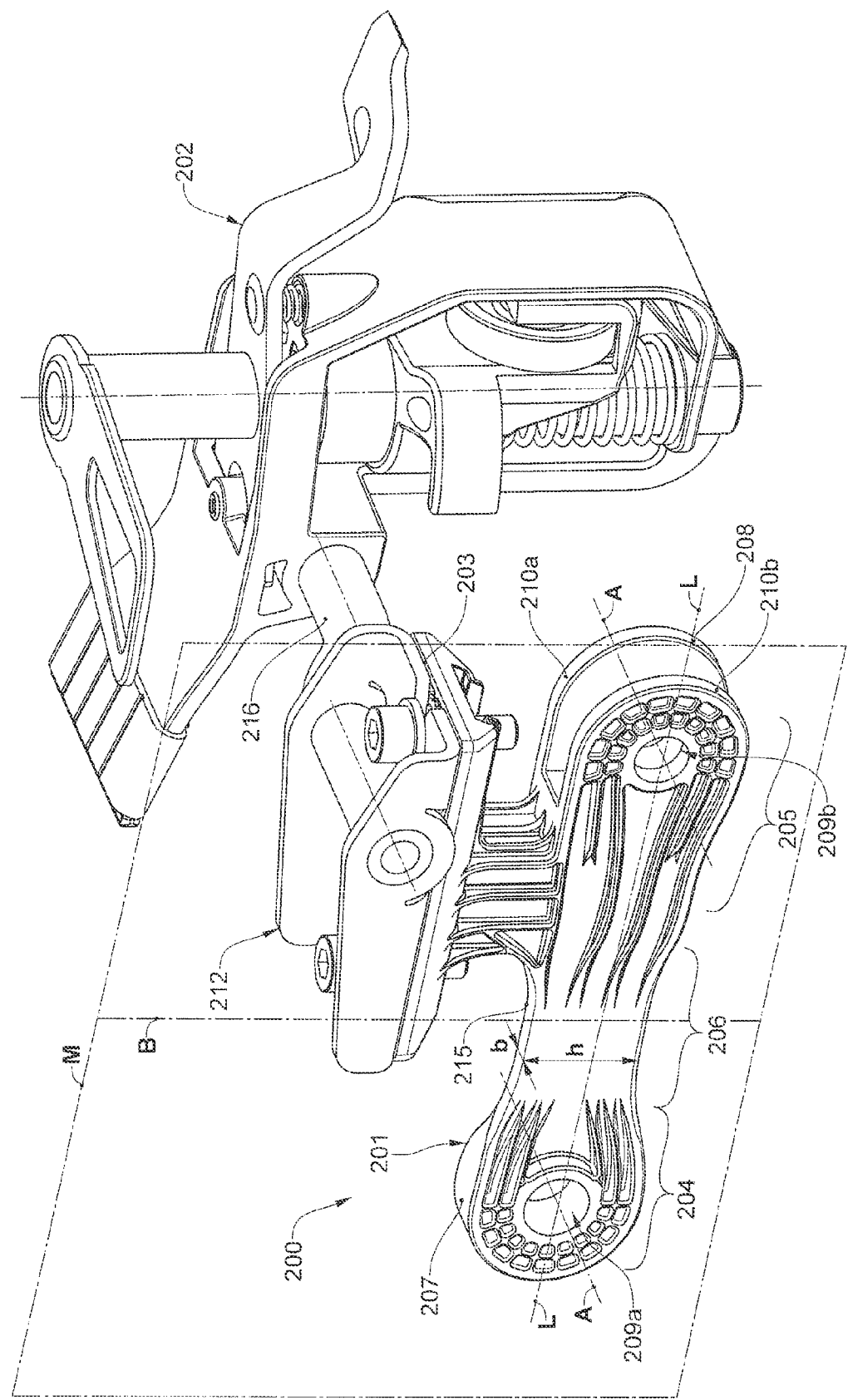
FIG. 7 is a perspective view of a further embodiment of a chain link according to the invention, with a conveying member.
Figure 8:
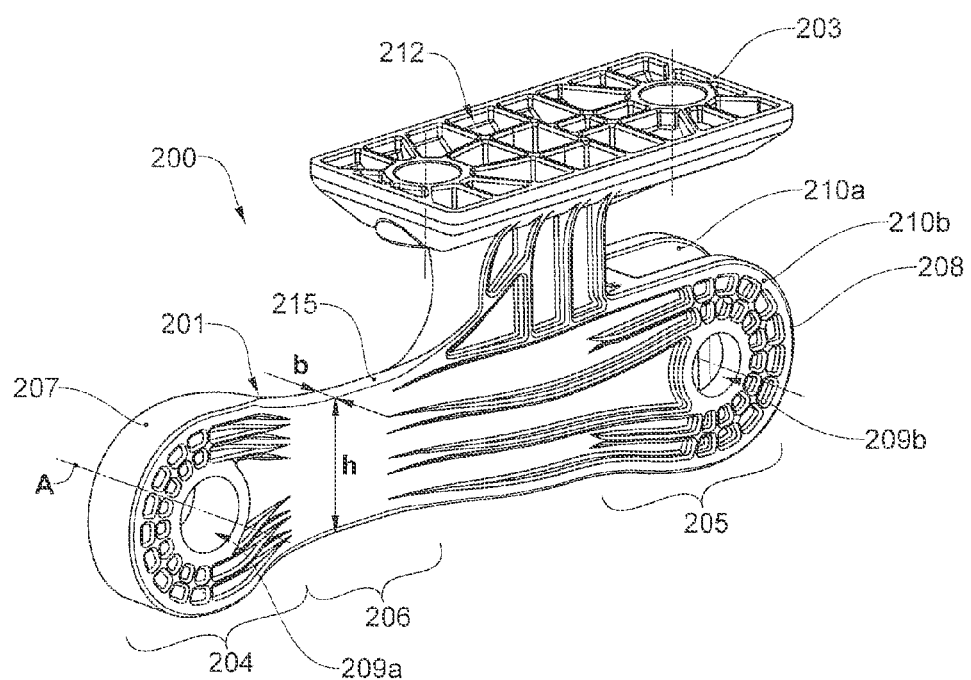
FIG. 8 is a perspective view of the chain link according to FIG. 7.
Figure 9:
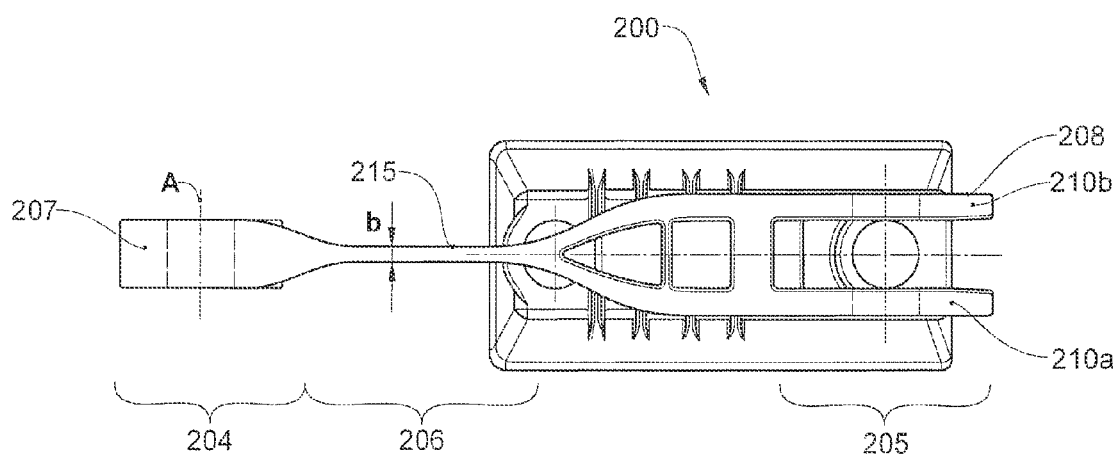
FIG. 9 is a plan view from below of the chain link according to FIG. 7.

The chain link 200 shown in the FIGS. 7 to 9 comprises a chain link base body 201 with a first end region 204 which forms a first coupling section 207, with a second end region 205 which forms a second coupling section 208, as well as with an intermediate region 206 which forms a bending-elastic body section 215. Moreover, the base body 201 comprises a connection interface 203 for fastening a conveying member 202.

The connection interface 203 is present in the form of a connection member which is integrally formed between the two coupling sections 207, 208, in particular in the proximity of the second coupling section 208 and with a connection surface 212 designed in a framework-like manner, with openings for connection bodies such as screws or bolts.

The bending-elastic body section 215 connects the first coupling section 207 to the remaining base body which contains the second coupling section 208 as well as the connection interface 203 for the conveying member. The bending-elastic body section 215 is designed such that the first coupling section 207 analogously to the previously described embodiment examples can be elastically bent relative to the second coupling section 208, about a bending axis B.

The base body 201 with the two end regions 204, 205, with the intermediate region 206 as well as, in the present embodiment example, also with the connection interface 203, is designed in a one-part manner. The two end regions 204, 205 are furthermore also twistable relative to one another about a longitudinal axis L via the elastically deformable body section 215.

The first coupling section 207 comprises a coupling head which is flattened on both sides, with an opening 209a, through which, as described hereinafter, a joint pivot can be pushed (not shown) for the purpose of creating a joint connection between the chain links. For this, a slide bush (not shown) which receives the joint pivot can be integrated into the opening 209a. The second coupling section 208 is designed in a fork-like manner and comprises two fork lugs or fork arms 210a, 210b which are distanced to one another and which each have an opening 209b. The fork lugs 210a, 210b form a receiver for the first coupling section 207 of a base body 201 of an adjacent chain link 200, said base body being designed in an equal manner.

For creating the connection, the joint pivot which moreover receives two runner rollers, after inserting the coupling head 207 between the two fork lugs 210a, 210b, is led through the openings 209a, 209b of the coupling head 207 and of the fork lugs 210a, 210b, said openings being aligned to one another, and is locked (for this, see also FIGS. 2a to 2c).

The bending-elastic body section 215 is a comparatively thin-walled, two-dimensional body section 215 of fibre-reinforced plastic with a relatively small ratio of the wall thickness b to the height h of the body section 215. The wall thickness is between 1 and 2 mm and in each case continuously increases from the body section 215 to the two end regions 204, 205.

The chain link 200, in the two end regions 204, 205 further comprises reinforcement ribs which lie at the outside and run longitudinally, in particular in the direction of the longitudinal axis L.

A conveying clip 202 which is known from the state of the art is fastened on the chain link 200 via the connection interface 203 of the chain link 200. For this, the conveying clip 202 is screwed to the connection interface 203 via a connection member 211 of the conveying clip 202 which is attached on a connection pivot 216. The connection member 211 for this lies in a surfaced manner on the connection surface 212 of the connection interface 203 which is designed in a framework-like manner.

The shown clip 202 with regard to its functional construction is known in the state of the art. Such a clip with the same manner of functioning is for example described in detail in CH 592 562 A, which is why a detailed description of this is omitted at this location.

The chain link 300 shown in the FIGS. 10 to 13 is constructed similarly to the chain link according to FIGS. 7 to 9. The chain link 300 comprises a chain link base body 301 with a first end region 304 which forms a first coupling section 307, with a second end region 305 which forms a second coupling section 308, as well as with an intermediate region 306 which forms a bending-elastic body section 315. Moreover, the chain link 300 has a connection interface 303 for fastening a conveying member (not shown).

The connection interface 303 is present in the form of a connection member with a connection surface 312 which is designed in a framework-like manner and has openings for connection bodies such as screws or bolts, said connection member being integrally formed between the two end regions 304, 305 in particular in the vicinity of the second coupling section 208.

The connection member 303 is connected to the base body 301 via a non-positive-fit and/or positive-fit connection arranged between the two coupling sections 207, 208 in the vicinity of the second coupling section 208. For this, the connection member 303 comprises a hollow pin 328 which is inserted into a corresponding opening in the base body 301 of the chain link 300 in a direction transverse to the rotation axis of the runner rollers 321a, 321b and transversely to the longitudinal direction L of the chain link. The connection member 303 is positioned and aligned on the base body 301 in this manner. A connection body, e.g. a connection bolt 329 is now inserted from the opposite side through the opening and the hollow pin and fixed.

A guide roller 322 whose rotation axis lies perpendicularly to the rotation axis of the runner rollers 321a, 321b as well as perpendicularly to the longitudinal direction of the chain link 300 is arranged on the connection member 303 of the chain link 300.

The bending-elastic body section 315 connects the first coupling section 307 to the remaining base body which contains the second coupling section 308. The bending-elastic body section 315 is designed such that the first coupling section 307 analogously to the previously described embodiment examples can be elastically bent about a bending axis B, relative to the second coupling section 308.

The base body 301 with the two end regions 304, 305 as well as with the intermediate region 306 is designed as one part. The two end regions 304, 305 via the elastically deformable body section 315 are furthermore also twistable relative to one another about a longitudinal axis L.

Figure 10:
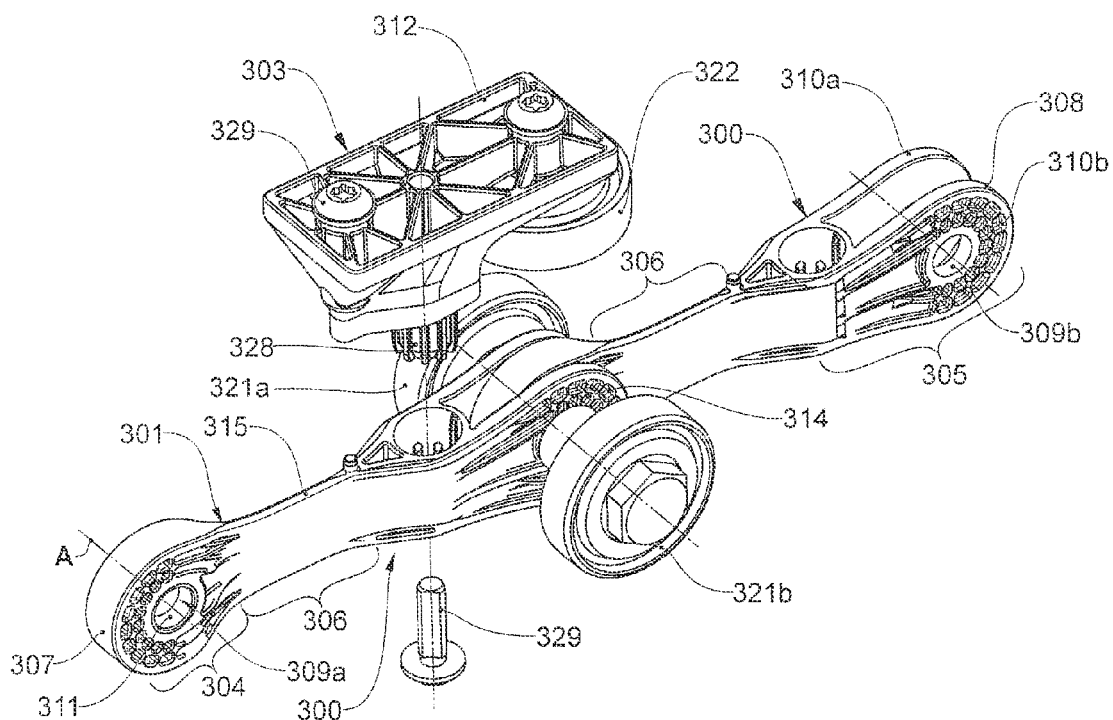
FIG. 10 is a perspective view of a further embodiment of a chain link according to the invention.
Figure 11:
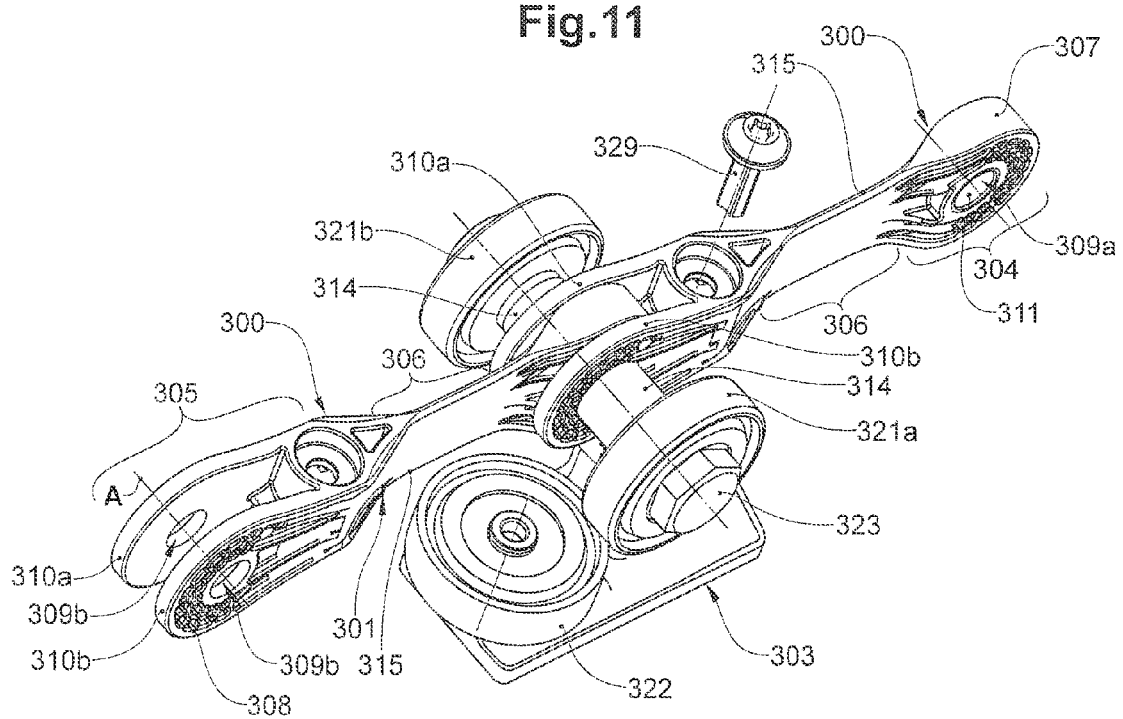
FIG. 11 is a perspective view from below of the chain link according to FIG. 10.

By way of example, two chain links 300 constructed in the same manner and connected to one another are shown in the FIGS. 10 to 12. The first coupling section 307 comprises a coupling head flattened on both sides, with an opening 309a. A slide bush 311 which receives a joint pivot 323 is integrated into the opening 309a. The second coupling section 308 is designed in a fork-like manner and comprises two fork lugs or fork arms 310a, 310b which are distanced to one another and are each with an opening 309b. The fork lugs 310a, 310b form a receiver for the coupling head 307 of the base body 301 of an adjacent chain link 30, said base body being constructed equally.

The coupling head 307 of a first chain link 300 is pushed between the two fork lugs 310a, 310b of the adjacent second chain link 300 for creating the connection. Subsequently, the joint pivot 323 is led through the openings 309a, 309b which are aligned to one another, of the coupling head 307 and of the fork lugs 310a, 310b, and locked.

A runner roller 321a, 321b is pushed in each case over the lateral end sections of the joint pivot 323, laterally outside the fork lugs 310a, 310b and fixed on this. The runner rollers 321a, 321b are each distanced somewhat to the adjacent fork lugs 310a, 310b. A spacer sleeve 413, through which the joint pivot 323 is led, is arranged in each case between the runner roller 321a, 321b and the fork lug 310a, 310b.

The bending-elastic body section 315 also according to this embodiment is a comparatively thin-walled, two-dimensional body section 315 of fibre-reinforced plastic with a relatively small ratio of wall thickness b to height h of the body section 315. The wall thickness is between 1 and 2 mm and continuously increases from the body section 315 towards the two end regions 304, 305.

The chain link 300 further in the two end regions 304, 305 comprises outer lying reinforcement ribs which run longitudinally, in particular in the direction of the longitudinal axis L.

A conveying clip can be fastened on the chain link 300 via the connection interface 303 of the chain link 300, e.g. analogously to the embodiment example according to FIG. 7.

In operation, the chain links 300 via the runner rollers 321a, 321b roll on a guide profile. The guide roller 322 serves for guiding the chain link 300 along the conveying path, in particular in curves. The guide roller 322 rolls along a guide path. However, no carrying loads bear on the guide roller 322, in contrast to the runner rollers 321a, 321b.

According to FIG. 13, the guide profile 325 is designed as a C-profile which has an undercut guide channel 326. The runner rollers 321a, 321b of the chain links 300 are arranged in the undercut regions of the guide channel 326 so that these cannot jump out of the guide channel 326. The guide roller 322 is arranged in the region of the guide gap of the guide profile 325 which leads into the guide channel 326.

The arrangement is designed such that the guide roller 322 can roll along a lateral longitudinal limitation of the guide gap 37. The lateral movement space is this limited by the guide roller 322. By way of this, one prevents for example the runner rollers 321a, 321b from laterally abutting in the guide channel 326.

The invention claimed is:

1. A chain link of a conveying chain, comprising:
a base body with a first end region which comprises a first coupling section for articulated connection to a coupling section of a first, adjacent chain link, and with a second end region which comprises a second coupling section for articulated connection to a coupling section of a second, adjacent chain link,
wherein the base body comprises an intermediate region which lies between the first and second end regions and which comprises an elastically deformable body section,
wherein the elastically deformable body section:
is designed in an elastically bendable manner such that the first end region, relative to the second end region, is bendable out of the longitudinal direction of the base body, and/or
is designed in an elastically twistable manner such that the first end region, relative to the second end region, is twistable about the longitudinal direction of the base body.

2. A chain link according to claim 1, wherein the elastically deformable body section is a plastic that is at least one of elastomer, thermoplastic, duroplastic and a fibre-reinforced plastic.

3. A chain link according to claim 1, wherein the elastically deformable body section is a spring steel material.

4. A chain link according to claim 1, wherein the elastically deformable body section includes a tension element that is a spring steel element, for accommodating tensile stresses.

5. A chain link according to claim 4, wherein the elastically deformable body section is an elastomer material, for accommodating compressive stresses, and a tension element is integrated into the elastomer material with a positive fit, for accommodating tensile stresses.

6. A chain link according to claim 1, wherein the elastically deformable body section is a body section which is multilayered in a longitudinal direction of the chain link of alternating elastically deformable segments of an elastomer, and rigid intermediate elements, of metal or plastic.

7. A chain link according to claim 1, wherein the second end region comprises a fork-like, second coupling section with two fork lugs, which forms a receiver for the coupling section of an adjacent chain link.

8. A chain link according to claim 1, wherein the elastically deformable body section includes at least one element of spring steel, which extends in a longitudinal direction of the chain link.

9. A chain link according to claim 8, wherein the at least one elastically deformable element is integrated into the base body towards the first and second end region with a positive fit.

10. A chain link according to claim 7,
wherein the elastically deformable body section comprises at least two spring-elastic elements which extend in the longitudinal direction of the chain link from the first coupling section in the direction of the second coupling section, run next to one another in the intermediate region and run apart towards the second coupling section, and
wherein at least one spring-elastic element leads into a fork lug.

11. A chain link according to claim 1, wherein the elastically deformable body section has a ribbed structure or is designed in a plate-like manner.

12. A chain link according to claim 1, wherein the two coupling sections comprise openings for receiving a joint pivot aligned perpendicularly to a longitudinal axis.

13. A conveying chain, comprising:
a plurality of chain links which are arranged one after another and are articulately connected to one another in the longitudinal direction of the chain links via joint connections,
wherein the chain links each comprise a first end region with a first coupling section and a second end region with a second coupling section, and the chain links are articulately connected to one another via coupling sections, and
wherein at least one chain link comprises an intermediate region which lies between the end first and second regions and which comprises an elastically deformable body section, wherein the elastically deformable body section:

is designed in an elastically bendable manner such that the first end region, relative to the second end region, is bendable out of the longitudinal direction of the base body, and/or is designed in an elastically twistable manner such that the first end region, relative to the second end region, is twistable about the longitudinal direction of the base body.

14. A conveying chain according to claim 13, wherein the chain links via the coupling sections are pivotably connected to one another about a joint pivot arranged perpendicularly to the longitudinal axis, and the first end region via the bending-elastic intermediate region is bendable relative to the second end region about a bending axis which is arranged perpendicularly to the joint pivot or pivot axis.

15. A conveying chain according to claim 13, wherein the conveying chain is constructed of constructionally equal chain links, and wherein the first coupling body of a first chain link assumes an articulated connection with the second coupling body of an adjacent, second chain link.

16. A conveying chain according to claim 13, including a plurality of chain links with a base body, said chain links being arranged one after the other and articulately connected to one another in the longitudinal direction via joint connections, wherein the chain links each comprise a first end region with a first coupling section and a second end region with a second coupling section, and the chain links via first and second coupling sections are articulately connected to one another, and a runner roller is arranged on at least one side of the coupling sections forming a joint connection, said at least runner roller being rotatably mounted via a joint pivot led through the first and second coupling sections, wherein a force transmission element that is a spacer sleeve, is arranged between the runner roller and the base body, through which force transmission element the joint pivot is led such that forces of a tilt moment which act on the joint pivot, are transmitted via the force transmission element into the base body of the chain link.

17. A conveying chain according to claim 16, wherein the force transmission element has an end-side which is a surfaced manner and via which the forces of the tilt moment are transmitted in a surfaced manner onto the base body.

18. A chain link base body of a chain link, comprising:

a first end region which comprises a first coupling section for articulated connection to a coupling section of a first adjacent chain link, and with a second end region which comprises a second coupling section for articulated connection to a coupling section of a second, adjacent chain link, wherein the base body comprises an intermediate region which lies between the first and second end regions and which comprises an elastically deformable body section, wherein the elastically deformable body section:

is designed in an elastically bendable manner such that the first end region, relative to the second end region, is bendable out of the longitudinal direction of the base body, and/or is designed in an elastically twistable manner such that the first end region, relative to the second end region, is twistable about the longitudinal direction of the base body.

19. A chain link base body according to claim 18, wherein the base body is one part, and includes at least one plastic material.

* * * * *